United States Patent

Lange et al.

[15] 3,651,663
[45] Mar. 28, 1972

[54] UNIVERSAL JOINT CONSTRUCTION

[72] Inventors: Gunter Lange, Siedlung Gluckauf; Jurgen Ulderup, Haldem, both of Germany

[73] Assignee: Lemforder Metallwaren AG, Lemforde, Hannover, Germany

[22] Filed: July 22, 1970

[21] Appl. No.: 57,117

[30] Foreign Application Priority Data

Aug. 18, 1969  Germany .................. P 19 41 975.1

[52] U.S. Cl. ............................................. 64/17 A
[51] Int. Cl. ............................................. F16d 3/26
[58] Field of Search ..................................... 64/17

[56] References Cited

UNITED STATES PATENTS 3,470,711  10/1969  Kayser .................................. 64/17 A
3,241,336  3/1966  Nemtsov ................................ 64/17

FOREIGN PATENTS OR APPLICATIONS 904,170  8/1962  Great Britain ......................... 64/17

*Primary Examiner*—Edward G. Favors
*Attorney*—McGlew and Toren

[57] ABSTRACT

A universal joint particularly for steering devices of motor vehicles includes pins of its cross link assembly which are mounted by means of plain or ball bearings and which are supported elastically in an axial plane. The axial support is effected by a pinlike buffer which is mounted within a bore defined in an end face of each pin and which bears against a portion of the housing of the connecting fork member.

7 Claims, 4 Drawing Figures

PATENTED MAR 28 1972 3,651,663

INVENTORS
GÜNTER LANGE
JÜRGEN ULDERUP
BY
McGlew & Toren
ATTORNEYS

UNIVERSAL JOINT CONSTRUCTION

SUMMARY OF THE INVENTION

This invention relates in general to universal joint construction and in particular to a new and useful universal joint having a cross link assembly which is supported in a fork member on bearings and which includes cross pins which are elastically supported in an axial plane.

The present invention relates to universal joints which include pins which are mounted by means of plain bearings or ball bearings. Such universal joints are particularly applicable for use in steering devices of motor vehicles and they must have a very small bending moment about the universal joint axes. At the same time the joint must be noiseless in operation and have no axial play. It is possible to achieve this freedom from axial play in a known manner by providing an initial stress between the end faces of the cross pins and the bottom of the needle bearing housing which are preferably used for supporting the cross pins. However, in order to ensure absolute noiselessness a high initial stress is required and this leads to an undesired large bending moment which is harmful to the joint.

In accordance with the present invention, there is provided a universal joint construction which is made free from play by simple means so that annoying rattling noises are avoided. In addition, the bending moments about the pin axes are relatively small. This is accomplished with the present invention by supporting the pins so that they are elastically mounted in axial directions. In one embodiment of the invention, the cross pins are provided with at least one end with an axially extending bore defined inwardly from the end face which provides a recess to receive an elastic buffer of rubber or rubber-elastic material. The buffer projects beyond the end face of the cross pins and bears against the bottom or outer end of the bearing housing. Preferably the end of the plastic buffers which project from the pin bores have a curved surface and engage a correspondingly shaped depression in the bottom of a bearing housing. The pins of the universal joint are thus additionally supported elastically in radial directions. The construction is such that the axial forces appearing in operation are first absorbed by the elastic buffers. Only this greater axial forces do the end faces of the cross pins bear against the bottoms of the needle bearing housings which then share in this support.

In this way there is a complete absence of noise with a minimum bending movement. A universal joint constructed in this manner may be of very simple design. The spring elements can be arranged in the joint to save space so that a relatively small overall size can be achieved.

Accordingly, it is an object of the invention to provide a universal joint particularly for steering devices of motor vehicles which include pins of cross link assemblies which are mounted by means of plain or ball bearings and which are supported elastically in an axial plane.

A further object of the invention is to provide a universal joint construction which includes a fork member of one part which engages with the housing for the bearings of the cross pin and wherein at least one cross pin includes an end face having a bore in which is positioned a buffer which extends beyond the end face and bears against the housing and provides an elastic mounting in an axial direction for the cross pin.

A further object of the invention is to provide a universal joint construction which is simple in design, rugged in construction, and economical to manufacture.

GENERAL DESCRIPTION OF THE PREFERRED EMBODIMENTS

Figure 1:
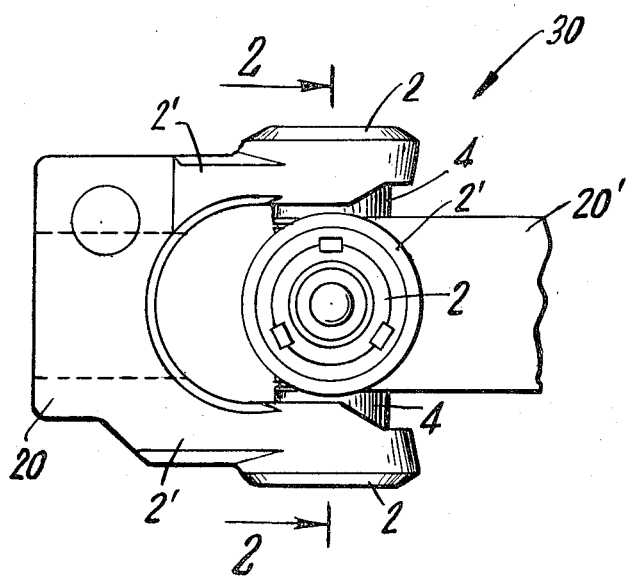
FIG. 1 is a side elevational view of a universal constructed in accordance with the invention.

Referring to the drawings in particular, the invention embodied therein comprises a universal joint construction generally designated 30 which includes fork members of fork pieces 20 and 20' having fork legs 2', 2' with eyes 2 for receiving and rotatably supporting individual pin elements 4 of a cross pin assembly generally designated 22. In the embodiments shown the pivotal bearings include needle bearings having needles 3 which are supported within housings 5 and which bear against the pins 4.

Figure 2:
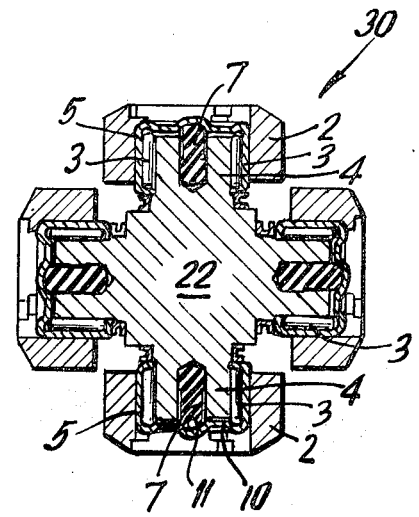
FIG. 2 is a section taken along the line 2—2 of FIG. 1.
Figure 3:
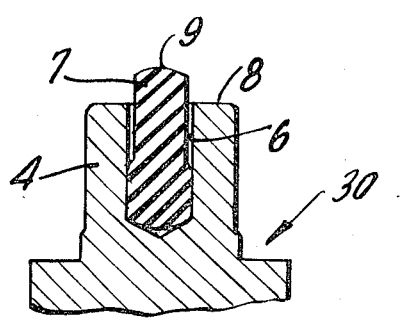
FIG. 3 is an enlarged partial sectional view of the cross pin indicated in FIG. 2.

In the embodiment of FIGS. 1 to 3, each pin 4 of the cross pin assembly 22 includes a bore 6 which is defined inwardly from an end face 8 in order to accommodate buffer means or elastic support means in the form of a buffer 7 which is made of a rubber or rubber-elasic material. The buffer 7 includes a rounded end 9 which projects outwardly beyond the end face 8 of its associated pin 4 and engages within a depression 11 of a bottom wall 10 of the housing 5.

Figure 4:
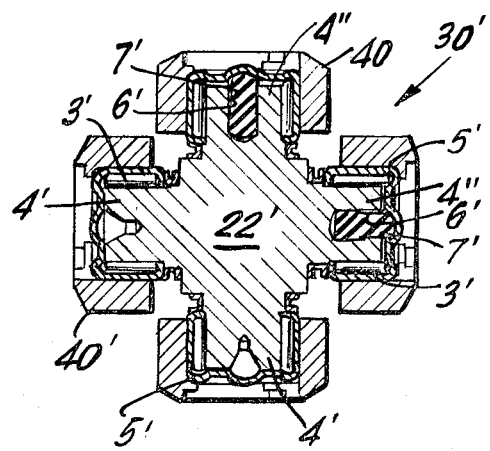
FIG. 4 is a view similar to FIG. 2 of another embodiment of the invention.

In the embodiment indicated in FIG. 4, there is provided an elastic joint 30' which includes a cross pin assembly 22' for universally pivotally supporting the respective fork pieces 40 and 40'. In this embodiment, each cross pin comprising pin portions 4' and 4'' are rotatively supported on bearings 3' in housings 5' as in the other embodiments. In this arrangement, only one axially extending pin, the pin 4' is provided with a bore 6' for receiving a buffer member 7'. In this way the axial elasticity is maintained but only one axially extending pin need be thus equipped so that the joint is further simplified.

What is claimed is:

1. A universal joint construction particularly for steering devices of motor vehicles comprising first and second fork pieces having fork leg portions with an eye for receiving a bearing housing, a bearing housing carried in each of said eyes, a cross pin assembly including a pin extending into and rotatably supported within said bearing housing of each fork leg, and elastic means in said housing for elastically supporting said cross pins in axial directions comprising a bore defined in at least one axially extending pin from the end face of said pin, an elastic member in said bore extending outwardly from the end face into elastic engagement with said housing.

2. A universal joint according to claim 1, wherein said housing includes an inner wall having a recess, said elastic means including an elastic member carried by at least one of said cross pins and engaged in the recess of said housing and providing an elastic support for said cross pins on said housing in an axial plane.

3. A universal joint according to claim 1, including a cup-shaped housing for each of said pins, needle bearings carried in said housing and engaged between said housing and each of said pins of said cross link assembly, said elastic means comprising an elastic member engaged between at least one of said pins and said housing.

4. A cross pin assembly for a universal joint comprising a member having at least two axially oppositely extending pins at least one of said two pins having a bore defined inwardly from an end thereof, a resilient member contained in said bore projecting outwardly from the end thereof, a bearing housing having bearing means in rotatable engagement with said pins and having an inner end wall resiliently bearing against said elastic member.

5. A cross pin assembly according to claim 4 wherein each of said pins has a bore extending inwardly from an end face thereof with an elastic member therein bearing between said pin and said housing.

6. A cross pin assembly according to claim 5 wherein said elastic member projects outwardly from the end of said bore and comprises a rubber elastic material.

7. A cross pin assembly according to claim 6 wherein each of said housings include an end wall with a centering recess, said elastic member being engaged in said centering recess.

* * * * *